United States Patent [19]

Felsvang et al.

[11] 4,279,873

[45] Jul. 21, 1981

[54] PROCESS FOR FLUE GAS DESULFURIZATION

[75] Inventors: Karsten S. Felsvang, Allerød; Ove E. Hansen, Vaerløse; Elisabeth L. Rasmussen, Holte, all of Denmark

[73] Assignee: A/S Niro Atomizer, Soborg, Denmark

[21] Appl. No.: 39,892

[22] Filed: May 17, 1979

[30] Foreign Application Priority Data

May 19, 1978 [DK] Denmark .............................. 2237/78

[51] Int. Cl.³ .............................................. C01B 17/00
[52] U.S. Cl. ...................................................... 423/242
[58] Field of Search .......... 423/244 A, 244 R, 242 A, 423/242 R, 243

[56] References Cited

U.S. PATENT DOCUMENTS

| | | | |
|---|---|---|---|
| 3,305,307 | 2/1967 | Sporman et al. | 23/129 |
| 3,533,748 | 10/1970 | Finfer et al. | 423/242 |
| 3,929,968 | 12/1975 | Taub | 423/242 |
| 3,932,587 | 1/1976 | Grawthan | 423/242 |
| 3,966,418 | 6/1976 | Frevel et al. | 23/284 |
| 3,969,482 | 7/1976 | Teller | 423/235 |
| 4,001,384 | 1/1977 | Iwakura et al. | 423/551 |
| 4,002,724 | 1/1977 | McKie | 423/242 |
| 4,197,278 | 4/1980 | Gehri et al. | 423/248 |

FOREIGN PATENT DOCUMENTS

| | | |
|---|---|---|
| 96138 | 10/1958 | Czechoslovakia . |
| 2304496 | 8/1974 | Fed. Rep. of Germany . |
| 2419579 | 11/1974 | Fed. Rep. of Germany . |
| 2550488 | 5/1977 | Fed. Rep. of Germany . |
| 1333635 | 10/1973 | United Kingdom . |

*Primary Examiner*—O. H. Vertiz
*Assistant Examiner*—Gregory A. Heller
*Attorney, Agent, or Firm*—Schuyler, Banner, Birch, McKie & Beckett

[57] ABSTRACT

$SO_2$ is absorbed from hot flue gas by spray drying a $Ca(OH)_2$-containing suspension in the flue gas. Fly ash is left in the flue gas which is to be treated in the spray absorption process, and the powder which is produced by the spray absorption process and which consequently contains the fly ash and partly reacted $Ca(OH)_2$ is partially recycled. Operation is controlled to obtain a temperature of the flue gas after the treatment which is 8°–20° C. above the saturation temperature of the flue gas at this stage. The process leads to optimum use of the $Ca(OH)_2$ used as absorbent and of the neutralization power inherent in the fly ash. Problems due to sedimentation of the absorbant before its atomization are avoided.

13 Claims, 4 Drawing Figures

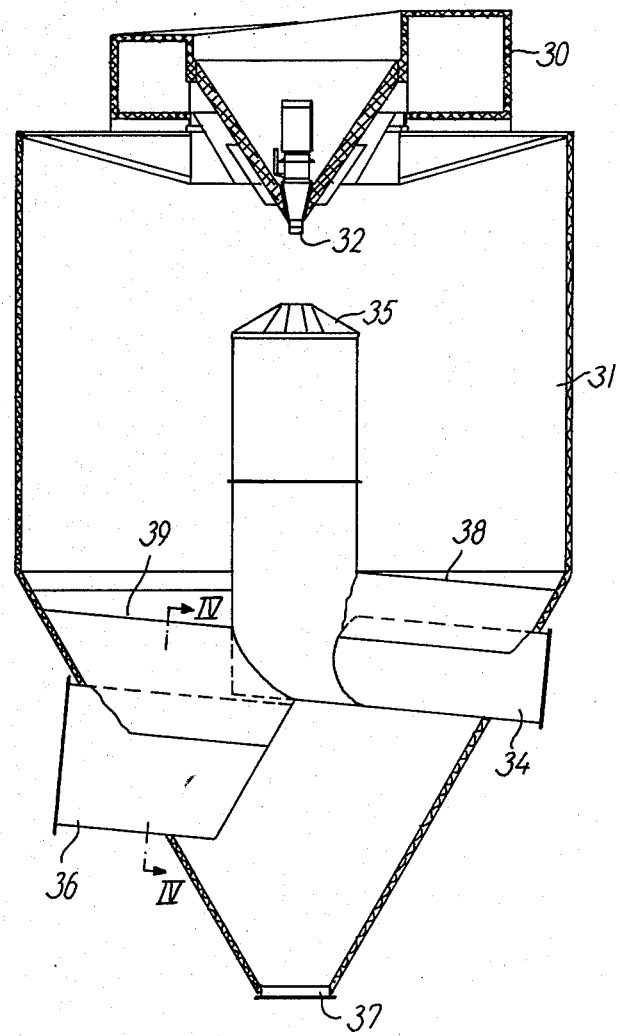
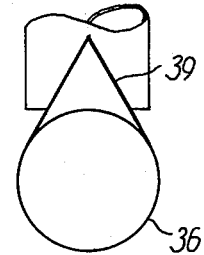
FIG.4
FIG.3

PROCESS FOR FLUE GAS DESULFURIZATION

FIELD OF THE INVENTION

The present invention is directed to an improved process for desulfurization of flue gas from the combustion of sulfur-containing fuel, in which process an aqueous calcium hydroxide-containing suspension is atomized in a hot flue gas stream, whereby the atomized suspension is dried to form a powder while a substantial amount of the $SO_2$ is simultaneously absorbed, and in which process the produced powder is partly recycled to the calcium hydroxide-containing suspension.

BACKGROUND OF THE INVENTION

Processes of the above-indicated type are well known in the art, viz. processes in which sulfur dioxide and sulfuric acid formed by oxidation thereof are fixed as sulfite and sulfate in a dry powder which results when a sulfur dioxide-containing flue gas is used as drying gas in a spray drying process in which the liquid which is atomized is a solution of a soluble strong base or a suspension of calcium hydroxide.

Such a process is described e.g. in U.S. Pat. No. 3,932,587. According to this specification the basic liquid is an aqueous solution or suspension containing at the most 40% by weight alkali metal carbonate or hydrogen carbonate, preferably sodium carbonate and/or sodium hydrogen carbonate. Due to the fact that the time is very short in which each atomized droplet of the basic liquid can react with the sulfur dioxide, it has hitherto been regarded as necessary (although the use of a calcium hydroxide suspension as basic liquid has been suggested) that the basic liquid should comprise a solution of a very soluble and very reactive basic substance such as e.g. sodium hydroxide or, as mentioned above, sodium carbonate. Indeed, a certain reaction between the sulfur dioxide and the particles formed by the atomization can take place also after the latter have been dried to a substantially anhydrous powder, but far the dominating part of the absorption reaction takes place while a liquid phase is still present in the atomized particles.

The water soluble substances, e.g. sodium carbonate, coming into consideration in the known processes of this type, are in many places so expensive, and the resulting sulfite- and sulfate-containing powder has so limited market, that the use of said soluble substances mainly comes into consideration in connection with a regeneration stage in which the sulfite- and sulfate-containing powder from the spray absorption-drying process is regenerated to carbonate or hydroxide. Regeneration in connection with the use of alkali metal hydroxide or carbonate as absorbents can, moreover, be necessary because disposal of the resulting sulfite-containing material may cause problems, as there is a risk that the material disposed of may contaminate subsoil water and streams due to the high solubility of the material.

However, such regeneration processes which i.a. are described in the above U.S. specification require an extensive plant and a complex operation, which has impeded the industrial utilization thereof.

Therefore, it is desired to provide a process of the type stated in the first paragraph of the present specification, in which process a basic material, viz. $Ca(OH)_2$, is used, which is so inexpensive and readily available that regeneration of the sulfite- and sulfate-containing product can be dispensed with, and in which the absorbent is utilized effectively and results in a powder which is easy to handle and discharge.

Several processes are known for desulfurization of flue gas, in which processes the flue gas is scrubbed with an aqueous basic liquid, e.g. in a scrubbing tower.

By the processes of this last-mentioned type, the basic liquid is not dried to produce a powder but leaves the reaction zone as a sulfite- and sulfate-containing liquid which is possibly recycled and/or regenerated. Processes of this last-mentioned type are e.g. disclosed in Danish specification No. 123 337, Swedish published patent application No. 371 368, U.S. Pat. No. 3,533,748 and DE-OS Nos. 2 304 496, 2 419 579 and 2 550 488.

The above-mentioned prejudice that calcium hydroxide is not suitable for processes in which the $SO_2$ absorption and spray drying of the absorbent take place simultaneously has been prevailing in spite of the fact that already in 1960 it was suggested in Czechoslovakian specification No. 96 138 to use a calcium hydroxide suspension as absorbent. In said specification it was suggested to improve the conversion of the calcium hydroxide by partially recycling the resulting powder to the suspension of $Ca(OH)_2$ to be atomized. However, this process has not found any substantial application, probably because the $Ca(OH)_2$ consumption has been unacceptable high in spite of the recycling.

In the method disclosed in said Czechoslovakian specification the fly ash contained in the flue gas is collected before the gas is contacted with the atomized calcium hydroxide suspension. It is not specified which temperature and humidity shall be obtained for the flue gas at the end of the treatment.

SUMMARY OF THE INVENTION

It has now be found that it is possible to perform a process as the one stated in the first paragraph of the present specification, i.e. a process of the type dealt with in the above-cited Czechoslovakian specification, using substantially less calcium hydroxide and still obtaining a sufficient $SO_2$ absorption, while the amount of substance which is recycled is kept at a low level acceptable when performing the process on a commercial scale.

This is achieved by a method which according to the invention is characterized in that fly ash present in the flue gas is only separated from the latter after the absorption and spray drying process, and is partly recycled together with a part of the powder resulting from the drying process to the step in which the calcium hydroxide-containing suspension is manufactured, and the ratio between on one side the amount of the calcium hydroxide-containing suspension and the content of dry matter thereof and, on the other side the temperature and moisture content of the flue gas, is adjusted to obtain a temperature of the flue gas after the treatment which is 8°–40° C. above the adiabatic saturation temperature (as to water) of said gas.

The reason why a specially efficient $SO_2$ removal is obtained by the process according to the invention cannot solely be explained by the fact that, in contrast to the method according to said Czechoslovakian specification, utilization of the absorption ability (known per se from e.g. DE-OS NO. 2 638 581) is obtained for the total amount of fly ash. The fact that fly ash is only separated after the absorption and spray drying process and is partly recycled for the production of the calcium hydroxide-containing suspension involves special advantages which are important for the efficiency of the absorption process. When the fly ash together with the powder produced in the absorption and spray drying process is recycled to the preparation of the calcium hydroxide suspension, the fly ash has a suspending effect on the particles of calcium hydroxide, which means that flocculation of the calcium hydroxide particles is substantially avoided, which flocculation would have been important if the calcium hydroxide suspension without recycling of fly ash had been diluted to obtain a sufficiently low viscosity to enable atomization. In this way the recycled particles of fly ash have the effect that the calcium hydroxide particles will be more evenly distributed and have a greater surface in the droplets formed by the atomization of the suspension. This greater surface gives a more complete reaction with the sulfur dioxide.

The fly ash particles remain, just as the particles produced by the absorption and spray drying process, substantially intact in the calcium hydroxide-containing suspension to be spray dried, and in the spray drying both of these types of particles will form nuclei in the droplets, on which nuclei the substantially smaller particles of fresh added calcium hydroxide is present. These last-mentioned calcium hydroxide particles will in this position have better conditions for reaction with the sulfur dioxide than if they e.g. were positioned in the central part of a particle consisting solely of small calcium hydroxide particles. Recycled powder enhances thereby the absorption by acting as carrier for the fresh added small calcium hydroxide particles, and for this purpose the fly ash particles are especially efficient because they, at least when they originate from a coal-fuelled boiler, have a substantially smaller size than the particles formed by the absorption and spray-drying process, which small size has proven to be optimum when the particles are to perform said carrier function.

A determining feature for obtaining a sufficient absorption using a relatively small amount of calcium hydroxide is, moreover, that the drying process is operated using such conditions that the flue gas after the treatment has a temperature which is 8°–40° C. above the saturation temperature of the treated gas. It has been found that when the latter conditions are fulfilled a substantially better absorption is achieved than when the temperature is outside this range. If the conditions are so that the gas after the treatment has a temperature which is more than 40° C. above its saturation temperature, the resulting powder will have a relatively high content of non-reacted calcium hydroxide, probably bacause the drying under these conditions is performed so fast that the period is too short in which the particles have a sufficient moisture content to enable a substantial reaction with the sulfur dioxide. Also by using temperatures lower than said range unsatisfactory results are, however, obtained. This is due mainly to the fact that in these cases a relatively large amount of calcium carbonate is formed, which has a somewhat lower reactivity to sulfur dioxide than calcium hydroxide. This production of carbonate will of course be especially adverse in a process using partial recycling as the present one.

It is surprising and quite unpredictable that a lower temperature limit exists which is caused by carbonate production.

It is observed that it is of substantial importance, although the process includes recycling of particles containing unreacted calcium hydroxide, that optimum reaction conditions prevail during the $SO_2$ absorption process, as otherwise the costs as regards apparatus as well as operation thereof will be increased.

A preferred embodiment of the process according to the invention is characterized in that the mixture of fly ash and powder produced by the process which is removed from the flue gas after the drying and absorption process is, for use in the preparation of the calcium hydroxide-containing suspension, suspended in water and only afterward brought into contact with makeup calcium hydroxide in the form of an aqueous $Ca(OH)_2$ paste produced by slaking of CaO.

This embodiment presents advantages as compared to what is achieved when the dry recycled powder consisting of fly ash and particles formed by the absorption and spray drying process are mixed with a previously diluted suspension of makeup calcium hydroxide. The said preferred process results in a better utilization of the alkalinity of the fly ash, as a better extraction is obtained with water than with a calcium hydroxide suspension, and, moreover, one achieves a better utilization of the freshly supplied calcium hydroxide, as by ensuring that the recycled particles including fly ash are saturated with water before being brought into contact with the calcium hydroxide suspension, one obtains that the calcium hydroxide only to a very small extent penetrates into the interior of the particles where it would not be in an optimum position to exert its $SO_2$ absorbing effect. On the contrary the calcium hydroxide particles will during the drying of the atomized droplets be deposited on the surface of the recycled particles where they have particylarly good possibilities of reacting with the sulfur dioxide. By this embodiment one furthermore avoids diluting the aqueous paste of calcium hydroxide formed by slaking of quicklime which is an advantage as such a dilution results in a certain agglomeration of the fine calcium hydroxide particles formed by slaking. When the said calcium hydroxide paste, on the contrary, is mixed with a suspension of the recycled particles, said suspension having about the same total solids content as the slaked lime paste but a substantially lower viscosity than this, such agglomeration is avoided and simultaneously one obtains a so substantial reduction of the viscosity of the calcium hydroxide paste that it becomes pumpable and is suitable for spraying. Said agglomeration of the calcium hydroxide particles is of course undesirable as it reduces the surface area of the particles and thereby impairs the reaction conditions for $SO_2$ absorption. In this embodiment the fresh makeup calcium hydroxide paste is preferably added to the suspension of recycle particles only immediately before the said suspension is atomized, avoiding thereby problems caused by crystal growth and sedimentation.

However, satisfactory results can also be achieved by adding the recycled particles to the aqueous $Ca(OH)_2$ paste without any preceeding suspension of the particles in water, which addition may be carried out simultaneous with or after the dilution of said $Ca(OH)_2$ paste. Also in this way a substantial part of the advantages mentioned in the paragraph immidiately above may be achieved as the recycled fly ash particles have a certain redispersing action on calcium hydroxide agglomerates which might have been formed before the addition of the recycled particles.

Fly ash has such a particle size that its presence in the recycled material contributes to a large extent to the obtainment of a high solids content in the suspension to be atomized without increasing the viscosity of said suspension to an inadmissible extent. This high solids content involves that a high SO$_2$ absorption may be obtained while at the same time the water evaporation is kept on a suitable low level. This in turn means that cooling and increase in water content of the flue gas will be less extensive, which is in itself an advantage, and moreover it becomes easier to meet the above requirements as to the temperature of the treated flue gas in relation to the saturation temperature of the latter.

In addition to the mentioned advantages of the process as compared to the related known processes, in particular the process disclosed in the above mentioned Czechoslovakian patent, a particular advantage of the process according to the invention is that is renders superfluous the use of a device for removing fly ash prior to the absorption and spray drying step.

Another embodiment is according to the invention characterized in that the composition and amount of the calcium hydroxide suspension is adjusted so that the molar ratio between calcium hydroxide and sulfur dioxide introduced into the spray dryer per time unit is 0.3–2.0 and the sulfur dioxide absorption 80–98%. When operating under such conditions, one obtains a satisfactory sulfur dioxide removal and at the same time the quantity of absorption material to be atomized is kept within economically acceptable limits.

A further preferred embodiment is according to the invention characterized in that the calcium hydroxide containing liquid contains an agent for increasing the solubility in water of the calcium hydroxide, preferably sodium chloride. It has been found that one obtains thereby a substantial improvement of the sulfur dioxide absorption. In tests where no recycling of the produced powder took place, an increase of 6.7% of the sulfur dioxide absorption was obtained by adding sodium chloride in an amount corresponding to about 0.5% of the quantity of liquid atomized. The provision of an optimum amount of sodium chloride in the basic liquid will often require no particular measures, as the water available for the formation of the suspension of recycled material will often contain a suitable amount of sodium chloride.

BRIEF DESCRIPTION OF THE DRAWINGS

The process according to the invention is illustrated further in the following with reference to the drawing where FIG. 3 shows in partial section a spray drier particularly suitable for the carrying out of the process on a commercial scale, and FIG. 4 shows a section marked IV—IV in FIG. 3.

DESCRIPTION OF THE PREFERRED EMBODIMENTS

Figure 1:
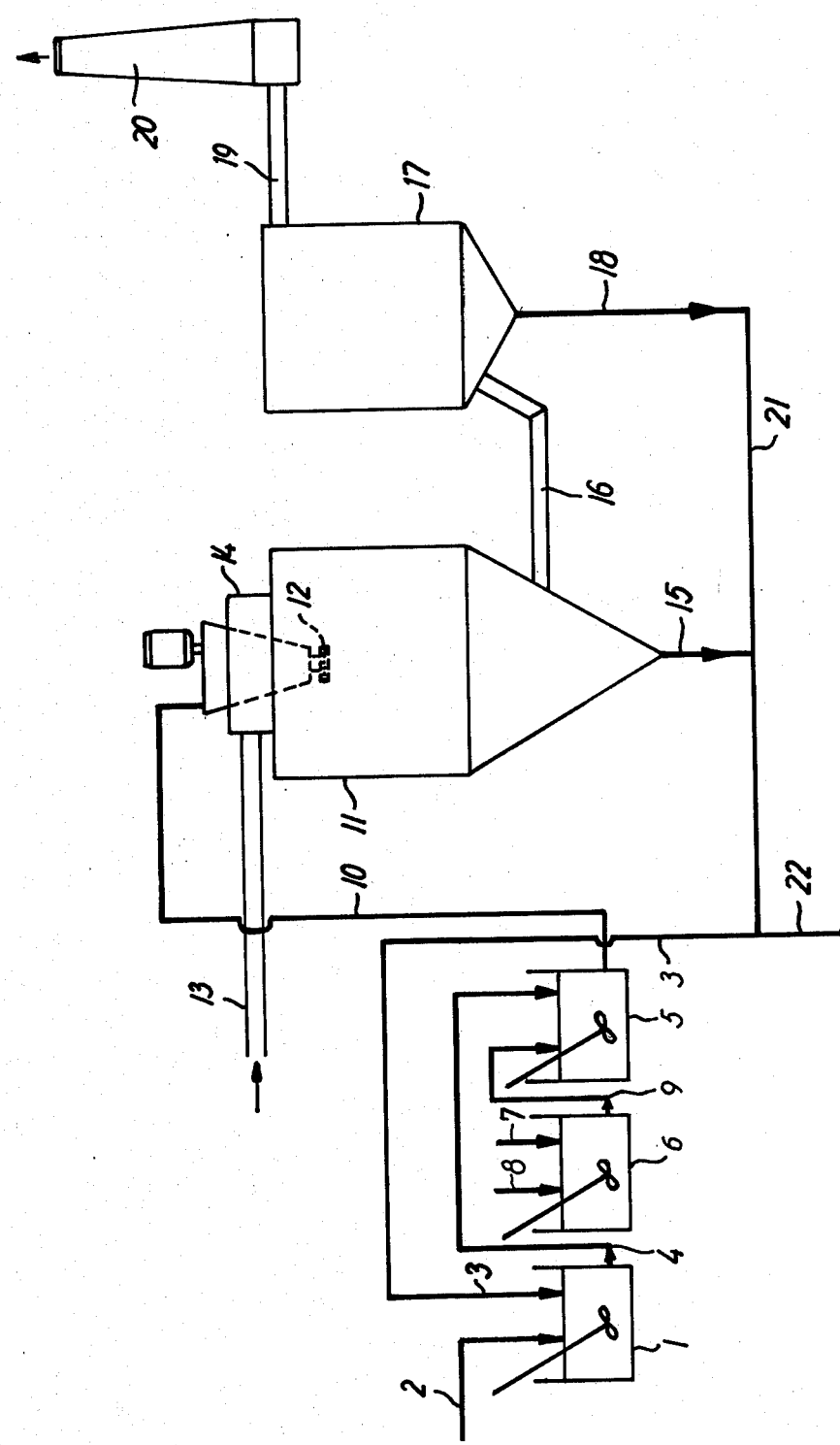
FIG 1 is a very simplified flow sheet of an embodiment of the process.

In the drawing, 1 is a suspension tank to which are supplied water and recycled particles consisting of fly ash and particles formed by the absorption and spray drying process described below, as indicated by the conduits 2 and 3, respectively. The suspension formed in tank 1 is fed through conduit 4 to a mixing tank 5. To a slaker 6 is fed quicklime through duct 7 and water through conduit 8. From slaker 6 the Ca(OH)$_2$ suspension is fed to the mixing tank 5 through conduit 9. The ratio between the two suspensions fed to this tank is in each case adjusted according to the sulfur dioxide content of the flue gas, i.e. according to the sulfur content of the fuel used in the period in question, and according to the temperature of the gas.

The amount of recycled powder fed to the suspension tank 1 through conduit 3 may vary within wide limits and represents e.g. between 10 and 90%, preferably between 30 and 70%, and in typical cases about 50% of the amount of powdered material including fly ash produced by the spray drying in question.

The slaking taking place in the slaker 6 results in calcium hydroxide having the form of very fine particles uniformly distributed in the paste resulting from the slaking. When this paste is in the mixing tank 5 mixed with the suspension from the suspension tank 1 no substantial flocculation or agglomeration of the fine calcium hydroxide particles takes place as would be the case if the calcium hydroxide paste had been diluted with water, which would at first sight had been most obvious. The presence of a great amount of particles, in particular fly ash, in the suspension wherein the freshly produced calcium hydroxide paste is mixed has surprisingly been found to have a markedly stabilizing effect so that the fine calcium hydroxide particles remain in suspension.

In order to achieve an optimum utilisation of this effect it has according to the invention proved advantageous to recycle a sufficient amount of the mixture of fly ash and powder formed by the absorption and spray drying process to obtain a suspension having after addition of makeup calcium hydroxide a total solids content of 30–55% by weight.

From the mixing tank 5 the mixture of Ca(OH)$_2$ suspension and suspension of recycled material is fed immediately through conduit 10 to a spray drying plant 11 wherein it is atomized, preferably using a rotary atomizer wheel 12 preferably of the abrasion resistant type as described in British Pat. No. 1,276,000.

The hot sulfur dioxide-containing flue gas to be purified is fed through duct 13 through which, in the embodiment shown in FIG. 1, the total amount of gas is fed to a roof air disperser 14 in the spray dryer.

The quantity of water fed to tank 1, the quantity of powder recycled thereto and the ratio between the supplies through 4 and 9, and the amount of suspension fed to the atomizer wheel are adjusted in view of the quantity of flue gas and its sulfur dioxide content and of the temperature of said gas, so that the molar ratio between supplied calcium hydroxide (including the amount contained in the recycled material in the suspension) and the sulfur dioxide per unit of time is between 0.3 and 2.5, and so that the flue gas after drying will have a temperature and moisture content corresponding to the above stated requirements, viz. a temperature from 8° to 40° C. above the sat. temp. Such calculations are a matter of routine to those skilled in the art.

In the spray drier the sulfur dioxide-containing gas is flowing from the air disperser 14 toward the lower part of the plant and is thereby brought into close contact with the droplets of calcium hydroxide-containing suspension ejected from the atomizer wheel 12. The temperature of the flue gas will at the inlet of the spray drier be in typical cases 120°–190° C., preferably 140°–160° C., and while the SO$_2$ is absorbed by the liquid droplets and reacts with the calcium hydroxide dissolved and suspended therein, a strong evaporation of the water contained in the droplets will take place. The droplets containing one or more fly ash particles or particles formed by spray drying which are recycled through conduit 3 will during part of the drying process have a nucleus constituted of one or more of these recycled particles, on the surface of which are positioned small particles of the freshly fed calcium hydroxide, which small particles in this position will have particularly good conditions for reacting with the sulfur dioxide of the flue gas.

The drying and chemical reaction of the atomized droplets result in a powder containing calcium sulfite and, further, some calcium sulfate and calcium carbonate while the remainder is mainly unreacted calcium hydroxide and fly ash.

Part of this powder is removed together with a further amount of fly ash through the bottom of the spray drier via conduit 15, while the remaining part together with the flue gas partially free from sulfur dioxide leaves the spray drier through duct 16. To this duct is preferably connected a duct (not shown) for supplying hot, non purified flue gas to be mixed with the purified gas with a view to increasing the temperature of the latter.

The duct 16 leads to a bag filter unit 17 where the flue gas is freed from entrained particles which are removed through conduit 18.

In large industrial plants it may be considered to use instead of the bag filter unit 17 an electrostatic pecipitator or another means for removing dust from a gas stream.

From unit 17 the purified gas is led via a pipe 19 to a stack 20 where its temperature will be sufficient to enable the gas to disperse into the atmosphere and to avoid condensation in the immediate proximity of the stack.

The powder removed through conduits 15 and 18 containing in addition to the particles formed by the absorption and spray drying process the essential part of the fly ash content of the flue gas, is led to conduit 21 from where it is partly recycled via 3 and partly removed through a conduit 22.

Figure 2:
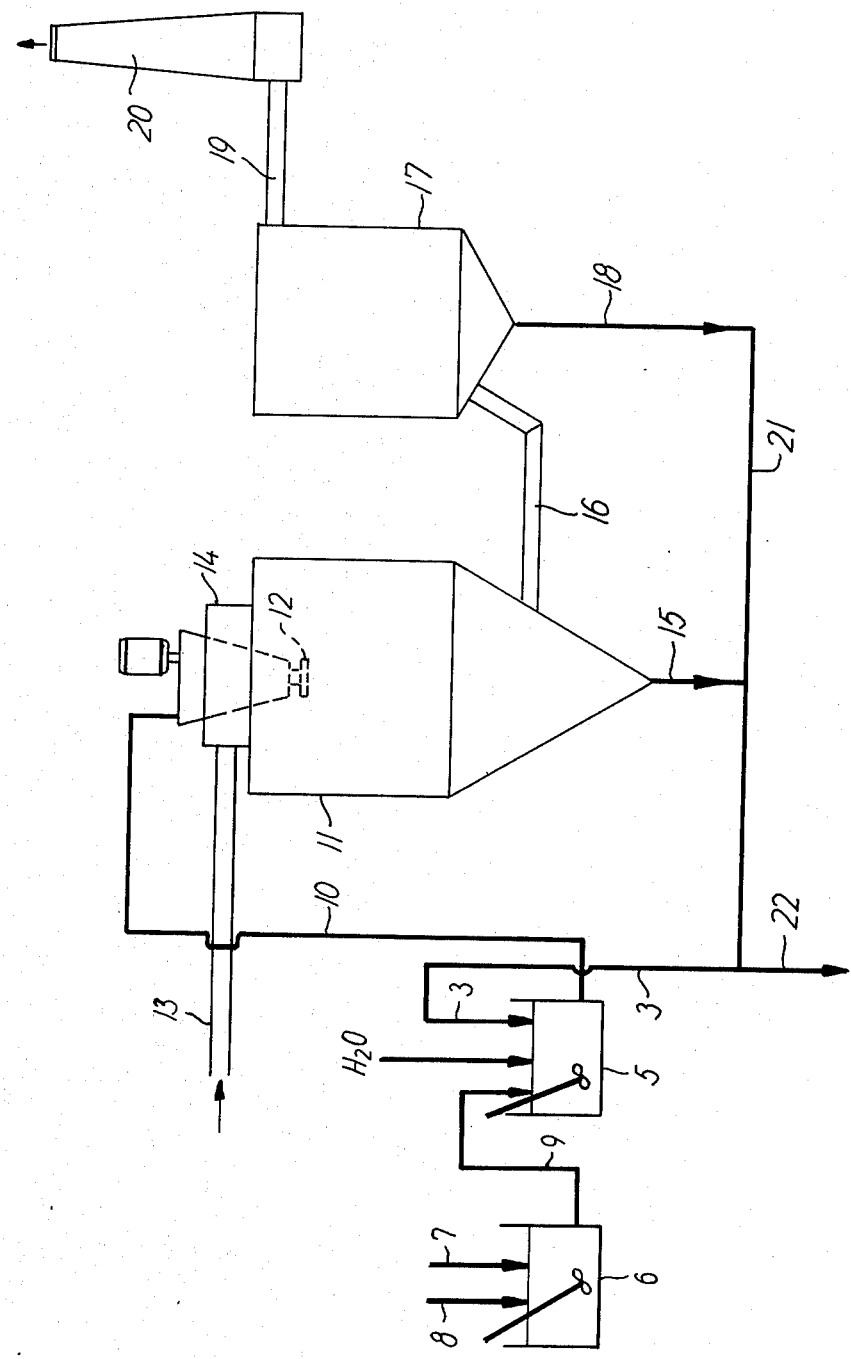
FIG. 2 is a very simplified flow sheet of an other embodiment of the process.

In FIG. 2 which as indicated illustrates an amended embodiment of the process according to the invention, the individual parts of the plant have been given the same numbers as corresponding parts in FIG. 1. Also in this embodiment the slaker 6 is fed with quickline through duct 7 and with water through conduit 8. The lime slaked with a surplus of water is fed to the mixing tank 5 through conduit 9. In the mixing tank 5 a dilution with water takes place (as indicated on the drawing) and recycled powder is added through conduit 3. The suspension prepared in this way is via conduit 10 fed to the spray drying plant 11 and the rest of the process is performed as described in connection with FIG. 1.

In large industrial plants it will be appropriate, instead of the spray drier 11 shown in FIG. 1 and FIG. 2, to use a spray drier of the type shown in FIG. 3. In this device the flue gas, the sulfur dioxide content of which is to be reduced, is divided in an adjustable manner into two streams, one of them being fed to a roof air disperser 30 through which it is dispersed over a rotary atomizer wheel 32 hanging down in a drying chamber 31, while the other stream is through a duct 34 led to the central part of the drying chamber 31 and is dispersed under the atomizer wheel. In this ambodiment the dispersion of this latter stream takes place by means of a disperser 35 which by means of vanes imparts to the air stream a rotary upward movement. A suitable adjustment of the ratio between the stream sent to the roof air disperser 30 and the stream dispersed via 35 makes it possible to achieve optimum contact between the atomized liquid droplets and the gas to be purified, which is of particular importance in the process in question, as the ratio between gas and liquid is much greater in this process than it is the case in the conventional spray drying processes.

Moreover the spray drying plant shown in FIG. 3 makes it possible to achieve an efficient operation of the spray drying process even when the flow rate of the flue gas is subject to substantial variations as is the case in the treatment of power plant flue gas. Said flexibility of this plant is mainly due to the fact that the ratio may be adjusted between the gas introduced through the roof disperser 30 and the gas introduced through the disperser 35.

The purified gas and the entrained particles leave the spray drying chamber 31 through duct 36 and part of the powder formed by the spray drying and of the fly ash is removed at the bottom of the chamber through an outlet positioned af 36.

In order to explain FIGS. 3 and 4, it should be remarked that above the approximately horizontal parts of ducts 34 and 36, provision is made of screens 38 and 39, respectively, in order to prevent powder deposits in these ducts.

The invention will be illustrated further by the following examples.

EXAMPLE I

A pilot plant designed as the one outlined in FIG. 1 was used. The stream of flue gas led through duct 13 amounted to 15,800 kg/hour and had a sulfur dioxide content of 1500 ppm (based on volume) and a fly ash content of about 5 g/m$^3$. Slaked lime was fed from the slakes 6 to the mixing tank 5 in an amount corresponding to about 70 kg Ca(OH)$_2$/hour. The tank 1 received per hour 210 kg of recycled powder having a calcium hydroxide content of 4% from which tank the aquous suspension was fed to the mixing tank 5.

The spray drier 11 had the following dimensions: diameter 3.3 m, height of the cylindrical part 2.2 m, cone angle 60° C.

The temperature of the flue gas fed through 13 was 156° C. and its temperature when leaving the spray drier was 76° C., which can be calculated as being 23° C. above the saturation temperature of the gas.

The powder recycled through conduit 3 had, as already mentioned, a content of non-reacted calcium hydroxide of 4% by weight, so that it can be calculated that the ratio between the total amount of calcium hydroxide fed to the spray drier and the amount of sulfur dioxide supplied was, on a molar basis, 1.4.

Under these conditions an absorption of 84% of the sulfur dioxide contained in the flue gas was obtained.

COMPARATIVE EXAMPLE 1

The procedure was the same as in Example I except that no recycling through conduit 3 took place, while the amount of fresh calcium hydroxide fed to the mixing tank was increased so that the total amount of calcium hydroxide fed to the atomizer wheel per time unit was the same as in Example I, and consequently, in this comparative example the ratio between calcium hydroxide and sulfur dioxide, calculated on molar basis, was also 1.4. In this case the sulfur dioxide absorption was only 67%. Thus it appears that the recycling of powder containing fly ash and particles originating from the absorption and spray drying process, due to the above-described carrier effect and the utilization of fly ash alkalinity results in a substantially better sulfur dioxide absorption although the total amount of calcium hydroxide present in the absorption process is the same.

The reproducibility of the experiments reported in the above example and comparative example is so high that the absorption increase obtained by including in the absorbent material recycled particles of fly ash and spray dried particles is significant.

COMPARATIVE EXAMPLE 2

The procedure was the same as in Example I except that the temperature of the flue gas led through duct 13 was 180° C., which resulted in the temperature of the effluent gas being 48° C. above the saturation temperature. In this case the sulfur dioxide absorption was only 70%.

COMPARATIVE EXAMPLE 3

The procedure was the same as in Example I except that the fly ash was removed from the flue gas before said gas was led through duct 13 to the spray drier. In this case the powder removed through 15 and 18 contained only immaterial amounts of fly ash and its content of calcium hydroxide was 7% by weight. The amount of powder recycled to the tank 1 was therefore reduced correspondingly so that the total amount of recycled calcium hydroxide was the same as in Example I. In this case a sulfur dioxide absorption of 76% was obtained, thus substantially less than the absorption achieved in Example I where fly ash was present during the absorption process and participated in the recycling.

EXAMPLE II

The procedure was the same as in Example I but in this case the amount of flue gas was 21,700 kg/hour and the sulfur dioxide content was 1330 ppm, based on volume.

The suspension of slaked lime was fed in an amount corresponding to 112 kg Ca(OH)$_2$/hour. The recycled amount of powder was 160 kg/hour and this powder contained about 9% of calcium hydroxide.

Through conduit 22 a quantity of 252 kg of powder/hour was removed having a calcium hydroxide content of 9%.

The temperature of the flue gas was 146° C. when entering the spray drier and when leaving the spray drier it was 76° C., which is about 21° C. above the saturation temperature.

The molar ratio between calcium hydroxide and SO$_2$ was in this case 1.8 and a sulfur dioxide absorption of 91% was obtained.

EXAMPLE III

The procedure was the same as in Example I but in this case the amount of fly ash-containing flue gas was 20,800 kg/hour with a sulfur dioxide content of 1320 ppm. The amount of calcium hydroxide suspension corresponded to 125 kg Ca(OH)$_2$ per hour.

An amount of powder of 259 kg/hour was recycled through 3, the content of Ca(OH)$_2$ being 10% by weight.

Through conduit 22 an amount of powder of 265 kg/hour with the said content of non reacted calcium hydroxide was removed.

The temperature of the flue gas entering the spray drier was 154° C. and the temperature of the effluent gas was 77° C., which is about 24° C. above its saturation temperature.

The ratio between calcium hydroxide and sulfur dioxide was in this case 2.5 and the absorption of sulfur dioxide 96%.

COMPARATIVE EXAMPLE 4

The procedure was the same in Example 3, except that the amount of calcium hydroxide which in Example III was fed by recycling of powder through 3 was replaced by a corresponding amount of fresh calcium hydroxide. In this case the sulfur dioxide absorption was 80%.

EXAMPLE IV

A pilot plant of the type describes in Example I was used. The amount of flue gas was in this case 20,800 kg/hour with a sulfur dioxide content of 548 ppm. The flue gas had a fly ash content of 4.5 g/m$^3$, the alcalinity of said fly ash being 0.89 milliequivalents per gram.

The temperature of the flue gas was 138° C. when entering the drier and 73° C. when leaving it.

A suspension having a total solids content of 51.9% by weight was fed to the spray drier. The concentration of freshly added lime was 4.1% while the remaining part of the solids was constituted by recycled fly ash-containing powder.

A sulfur dioxide removal amounting to a total of 93.8% was obtained. The stoichiometric ratio was calculated as 0.76.

It appears from this Example that the alkalinity of fly ash can be utilized in the process according to the invention, as it can be calculated that a proportion of 0.32 milliequivalents per g of the fly ash alkalinity was utilized.

EXAMPLE IV

The pilot plant described in Example I was used under the following conditions:
Amount of flue gas: 19,900 kg/hour
Temperature of inlet gas: 135° C.
Temperature of outlet gas: 72° C.
SO$_2$ concentration: 170 ppm
Fly ash concentration: 4.5 mg/m$^3$
Fly ash alkalinity: 0.84 milliequivalents per g The dry matter concentration of the suspension to be atomized was 47.5% by weight. The content of freshly added lime in this suspension was 0.9%.

A sulfur dioxide removal of 97.8% was obtained. The stoichiometric ratio was calculated as 0.39.

It can be calculated that in this case a proporion of 0.43 milliequivalents/g of the fly ash alkalinity was utilized.

We claim:

1. A process for desulfurization of fly ash-containing flue gas from the combustion of coal, comprising the steps of:
    (a) atomizing an aqueous feed suspension comprising Ca(OH)$_2$ and fly ash into the hot flue gas coming from a boiler without previous removal of fly ash therein, the amount of said suspension and the water content thereof being adjusted to obtain a temperature of the desulfurized flue gas being 8°–40° C. above the saturation temperature of said gas, thereby simultaneously drying the atomized droplets of suspension and reducing the SO$_2$ content of the flue gas;

(b) collecting a fly ash-containing dry powder comprising conglomerates of fly ash originating from said feed suspension with materials formed by the drying and SO$_2$ absorption step;

(c) preparing an aqueous suspension from a recycled portion of said fly ash-containing dry powder and disposing of the remaining portion; and (d) adding freshly slaked lime to the last-mentioned suspension as makeup Ca(OH)$_2$ to produce a feed suspension to be atomized in step (a).

2. A process for the desulfurization of hot, fly ash-containing flue gas from the combustion of sulfur-containing fuel, said process comprising the steps of:

(a) preparing an aqueous feed suspension comprising calcium hydroxide and fly ash;

(b) atomizing said feed suspension in a stream of said hot, fly ash-containing flue gas in a drying chamber to effect drying of the resulting atomized droplets and absorption of sulfur dioxide in said flue gas;

(c) recovering a dry fly ash-containing powder comprising conglomerates of fly ash originating from the feed suspension with materials resulting from the drying and sulfur dioxide absorption step, and (d) recycling a portion of the fly ash-containing powder recovered in step (c) for use in preparation of said aqueous feed suspension;

said drying and sulfur dioxide absorption being effected while maintaining the temperature of the flue gas effluent from said drying chamber at from about 8° to about 40° C. above the adiabatic saturation temperature of said gas by controlling the amount of feed suspension forwarded to said drying chamber and the total solids content of said feed suspension, in response to the amount, temperature and moisture content of the flue gas feed in said drying chamber.

3. A process as claimed in claim 1 or 2, wherein the amount of the recycled portion of said fly ash-containing powder is sufficient to obtain a suspension having after addition of makeup calcium hydroxide a total solids content of 30-55% by weight.

4. A process as claimed in claims 1 or 2, wherein the flue gas, the sulfur dioxide content of which is to be reduced, is divided in an adjustable manner into two streams, one of them being fed to air dispersing means disposed in the upper part of a drying chamber of a spray drier and being dispersed around a rotary atomizer wheel hanging in the drying chamber, while the other stream is introduced into the central part of the drying chamber and is dispersed under the atomizer wheel.

5. A process as claimed in claims 1 or 2, wherein the calcium hydroxide-containing suspension contains an agent for increasing the solubility in water of calcium hydroxide.

6. The process of claim 2 wherein the recycled portion of said fly ash-containing powder is mixed with water to form a first suspension and said feed suspension is prepared by adding to said first suspension fresh makeup calcium hydroxide in the form of an aqueous calcium hydroxide paste produced by slaking calcium oxide.

7. The process of claims 1 or 2 wherein the molar ratio per unit time between the total reactive calcium hydroxide in said feed suspension and the sulfur dioxide in said flue gas feed is maintained in the range of from 0.3–2.0 by adjusting the composition and amount of said feed suspension and wherein from about 80 to about 98% of the sulfur dioxide is removed from said flue gas.

8. The process of claim 1 or 2 wherein the recycled portion of said fly ash-containing powder comprises powder recovered directly from said drying chamber.

9. The process of claim 1 or 2 wherein the recycled portion of said fly ash-containing powder comprises powder recovered directly from said drying chamber and powder recovered from the flue gas after leaving the drying chamber.

10. The process of claim 2 wherein said hot, fly ash-containing flue gas is from the combustion of coal in a boiler and said flue gas has had no prior removal of fly ash therefrom.

11. The process of claim 2 wherein said feed suspension is prepared by mixing fresh makeup calcium hydroxide with said recycled powder.

12. The process of claim 2, wherein the part of said dry powder recovered from the flue gas after leaving said drying chamber is recovered by means of a particulate removal device.

13. The process of claim 12 wherein said particulate removal device is a bag filter unit.

* * * * *

UNITED STATES PATENT AND TRADEMARK OFFICE
CERTIFICATE OF CORRECTION

PATENT NO. : 4,279,873
DATED : July 21, 1981
INVENTOR(S) : Karsten S. Felsvang, Ove Emil Hansen, Elisabeth Lund Rasmussen It is certified that error appears in the above—identified patent and that said Letters Patent is hereby corrected as shown below:

In the Abstract, line 9, "8°-20°C" should read -- 8°-40°C --.

Column 5, line 13, "is", second occurrence, should read -- it --.

Signed and Sealed this

Sixth Day of October 1981

[SEAL]

Attest:

GERALD J. MOSSINGHOFF

Attesting Officer   Commissioner of Patents and Trademarks

REEXAMINATION CERTIFICATE (2842nd)
United States Patent [19]

Felsvang et al.

[11] B1 4,279,873
[45] Certificate Issued Apr. 16, 1996

[54] PROCESS FOR FLUE GAS DESULFERIZATION

[76] Inventors: Karsten S. Felsvang, Allerød; Ove E. Hansen, Vaerløse; Elisabeth L. Rasmussen, Holte, all of Denmark

Reexamination Requests:
No. 90/003,279, Dec. 15, 1993
No. 90/003,896, Jul. 11, 1995
No. 90/003,916, Jul. 7, 1995

Reexamination Certificate for:
| | |
|---|---|
| Patent No.: | 4,279,873 |
| Issued: | Jul. 21, 1981 |
| Appl. No.: | 39,892 |
| Filed: | May 17, 1979 |

Certificate of Correction issued Oct. 6, 1981.

[30] Foreign Application Priority Data

May 19, 1978 [DK] Denmark ................... 2237/78

[51] Int. Cl.[6] ................ C01F 11/46; C01B 17/96; B01J 10/00
[52] U.S. Cl. ................ 423/244.07; 423/243.08; 423/244.02; 423/244.08
[58] Field of Search ................ 423/243.01, 243.08, 423/244.01, 244.02, 244.07, 244.08

[56] References Cited

U.S. PATENT DOCUMENTS

| | | | |
|---|---|---|---|
| 853,559 | 5/1907 | Maignen et al. | 95/108 |
| 1,023,179 | 4/1912 | Strickler | 423/512.1 |
| 1,091,429 | 3/1914 | Friedrich et al. | 423/519 |
| 1,221,505 | 4/1917 | Bradley et al. | 423/241 |
| 1,577,534 | 3/1926 | Miller | 95/107 |
| 1,830,174 | 11/1931 | Peebles | 159/4.01 |
| 1,865,754 | 7/1932 | Hand | 423/512.1 |
| 1,957,251 | 5/1934 | Dean | 96/108 |
| 1,982,241 | 11/1934 | Aydelotte | 423/512.1 |
| 1,983,789 | 12/1934 | Bradley et al. | 423/512.1 |

(List continued on next page.)

FOREIGN PATENT DOCUMENTS

| | | |
|---|---|---|
| 522956 | 5/1979 | Australia . |
| 876383 | 9/1979 | Belgium . |
| 1119778 | 3/1982 | Canada . |
| 96138 | 7/1960 | Czech Rep. . |
| 2650755 | of 0000 | Denmark . |
| 123337 | 10/1972 | Denmark . |
| 152970 | 11/1979 | Denmark . |
| 13987 | 2/1982 | Egypt . |
| 0103449 | of 0000 | European Pat. Off. . |
| 0005301 | 11/1979 | European Pat. Off. . |
| 2181988 | 7/1973 | France . |

(List continued on next page.)

OTHER PUBLICATIONS

Ness et al, "Flue Gas Desulfurization Using Fly Ash Alkali Derived from Western Coals," Interagency Energy–Environment Research and Development Program Report, EPA–600/7–77–075 (Jul. 1977).

Hesketh et al, "Reduce $SO_2$ Emissions Using Fly Ash Slurries," Proceedings of the Sixth Environmental Engineering and Science Conference (Feb. 28, 1977).

Arthur D. Little, Inc., "Application of Scrubbing Systems to Low Sulfur/Alkaline Ash Coals," EPRI FP–595 Research Project 785–1, Final Report (Dec. 1977).

(List continued on next page.)

*Primary Examiner*— Gary P. Straub

[57] ABSTRACT

$SO_2$ is absorbed from hot flue gas by spray drying a $Ca(OH)_2$-containing suspension in the flue gas. Fly ash is left in the flue gas which is to be treated in the spray absorption process, and the powder which is produced by the spray absorption process and which consequently contains the fly ash and partly reacted $Ca(OH)_2$ is partially recycled. Operation is controlled to obtain a temperature of the flue gas after the treatment which is 8°–40° C. above the saturation temperature of the flue gas at this stage. The process leads to optimum use of the $Ca(OH)_2$ used as absorbent and of the neutralization power inherent in the fly ash. Problems due to sedimentation of the absorbant before its atomization are avoided.

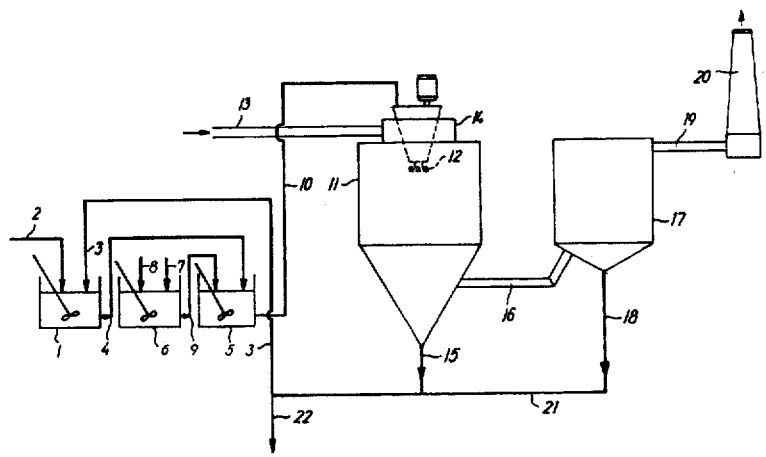

U.S. PATENT DOCUMENTS

| Number | Date | Name | Class |
|---|---|---|---|
| 2,021,936 | 11/1935 | Johnstone | 423/243.1 |
| 2,073,039 | 3/1937 | Wilton et al. | 423/243.09 |
| 2,177,707 | 10/1939 | Gaither | 423/574.1 |
| 2,198,745 | 4/1940 | Smith | 65/27 |
| 2,210,405 | 8/1940 | Haywood | 423/512.1 |
| 2,231,309 | 2/1941 | Weber | 423/243.04 |
| 2,333,193 | 11/1943 | Persson et al. | 423/242.1 |
| 2,375,560 | 5/1945 | Hutchinson et al. | 423/210 |
| 2,718,453 | 9/1955 | Beckman | 423/244.08 |
| 2,780,307 | 2/1957 | MacAfee | 95/187 |
| 2,813,000 | 11/1957 | Quittenton | 423/240 R |
| 2,843,217 | 7/1958 | Von Linde | 423/243.01 |
| 2,895,500 | 7/1959 | Barnett | 137/501 |
| 2,919,174 | 12/1959 | Pring | 209/273 |
| 2,994,588 | 8/1961 | Eickmeyer | 423/574.2 |
| 3,111,377 | 11/1963 | Mugg | 423/428 |
| 3,148,950 | 9/1964 | Mugg | 423/637 |
| 3,305,307 | 2/1967 | Spormann et al. | 423/512.1 |
| 3,324,630 | 6/1967 | Teller et al. | 261/98 |
| 3,343,908 | 9/1967 | Wickert | 423/243.05 |
| 3,395,512 | 8/1968 | Finney, Jr. et al. | 95/273 |
| 3,438,727 | 4/1969 | Heredy | 423/244.08 |
| 3,438,733 | 4/1969 | Grantham et al. | 423/244.08 |
| 3,438,734 | 4/1969 | Grantham et al. | 423/244.08 |
| 3,474,207 | 10/1969 | De Smet | 200/175 |
| 3,475,121 | 10/1969 | Thornton | 423/244.07 |
| 3,505,008 | 4/1970 | Frevel et al. | 423/244.08 |
| 3,520,649 | 7/1970 | Tomany et al. | 423/244.05 |
| 3,524,720 | 8/1970 | Bauer | 423/244.08 |
| 3,533,748 | 10/1970 | Finfer et al. | 423/243.12 |
| 3,632,306 | 1/1972 | Villiers et al. | 423/244.08 |
| 3,635,665 | 1/1972 | Mattern | 423/243.08 |
| 3,660,692 | 5/1972 | Bartlett | 307/293 |
| 3,687,623 | 8/1972 | Terrana et al. | 423/243.09 |
| 3,708,266 | 1/1973 | Gustavsson | 423/243.01 |
| 3,745,751 | 7/1973 | Zey et al. | 423/243.04 |
| 3,767,765 | 10/1973 | Gustavsson et al. | 423/243.08 |
| 3,781,407 | 12/1973 | Kamijo et al. | 423/243.03 |
| 3,784,389 | 1/1974 | Hastrup | 106/752 |
| 3,785,111 | 1/1974 | Pike | 55/410 |
| 3,789,628 | 2/1974 | Mahoney | 95/205 |
| 3,834,123 | 9/1974 | Margraf | 95/279 |
| 3,851,042 | 11/1974 | Minnick | 423/243.08 |
| 3,870,840 | 3/1975 | Rivetta et al. | 200/5 A |
| 3,880,629 | 4/1975 | Dulin et al. | 423/243.08 |
| 3,882,221 | 5/1975 | Wilson | 423/243.08 |
| 3,895,994 | 7/1975 | Saguchi et al. | 159/4.01 |
| 3,897,540 | 7/1975 | Onnen | 423/243.11 |
| 3,904,742 | 9/1975 | Akimoto | 423/243.08 |
| 3,911,084 | 10/1975 | Wall et al. | 423/243.08 |
| 3,914,387 | 10/1975 | von Jordan et al. | 423/243.08 |
| 3,919,394 | 11/1975 | Selmeczi | 423/243.05 |
| 3,929,968 | 12/1975 | Taub | 423/243.05 |
| 3,932,587 | 1/1976 | Grantham et al. | 423/244.08 |
| 3,933,978 | 1/1976 | Margraf | 423/244.01 |
| 3,958,961 | 5/1976 | Bakke | 96/47 |
| 3,966,418 | 6/1976 | Frevel et al. | 423/243.01 |
| 3,966,878 | 6/1976 | Pausch et al. | 423/243.09 |
| 3,969,482 | 7/1976 | Teller | 423/235 |
| 3,980,756 | 9/1976 | Dixson et al. | 423/243.03 |
| 3,981,972 | 9/1976 | Hishinuma et al. | 423/244 |
| 3,985,860 | 10/1976 | Mandelik | 423/242 |
| 3,989,465 | 11/1976 | Onnen | 422/170 |
| 3,995,005 | 11/1976 | Teller | 423/240 R |
| 4,001,384 | 1/1977 | Iwakura | 423/551 |
| 4,002,724 | 1/1977 | McKie | 423/243.08 |
| 4,006,066 | 2/1977 | Sparwald | 423/484 |
| 4,019,444 | 4/1977 | Kleeberg et al. | 423/240 R |
| 4,024,220 | 8/1975 | Ostroff | 423/242 |
| 4,039,304 | 8/1977 | Bechthold et al. | 423/243.06 |
| 4,061,513 | 12/1977 | Danielson | 156/392 |
| 4,081,513 | 3/1978 | Moss | 423/243.11 |
| 4,150,096 | 4/1979 | Nelms et al. | 423/242 |
| 4,164,547 | 8/1979 | Simko | 423/244.01 |
| 4,178,349 | 12/1979 | Wienert | 423/244 |
| 4,197,278 | 4/1980 | Gehri et al. | 423/242 |
| 4,198,380 | 4/1580 | Kohl | 423/242 |
| 4,208,381 | 6/1980 | Isahaya et al. | 423/210 |
| 4,208,383 | 6/1980 | Kisters et al. | 423/243.08 |
| 4,246,242 | 1/1981 | Butler et al. | 423/243.08 |
| 4,804,521 | 2/1989 | Rochelle et al. | 423/244.07 |

FOREIGN PATENT DOCUMENTS

| Number | Date | Country |
|---|---|---|
| 2226201 | 11/1974 | France . |
| 2228529 | 12/1974 | France . |
| 2332051 | 6/1977 | France . |
| 2425887 | 5/1979 | France . |
| 2194470 | 3/1994 | France . |
| 2215065 | 3/1972 | Germany . |
| 2419579 | 11/1974 | Germany . |
| 2159186 | 1/1975 | Germany . |
| 2650755 | 5/1977 | Germany . |
| 2615828 | 10/1977 | Germany . |
| 2638581 | 3/1978 | Germany . |
| 2919542 | 11/1979 | Germany . |
| 75064 | 11/1979 | Greece . |
| 1120965 | 3/1979 | Italy . |
| 498458 | 1/1974 | Japan . |
| 4924342 | 6/1974 | Japan . |
| 51-112777 | 10/1976 | Japan . |
| 4541986 | 7/1985 | Malaysia . |
| 6997 | 5/1979 | Mexico . |
| 15456 | 1/1983 | Philippines . |
| 13735 | 2/1983 | Rep. of Korea . |
| 50585 | 6/1985 | Singapore . |
| 792381 | 5/1980 | South Africa . |
| 7016764 | 11/1974 | Sweden . |
| 448522 | 11/1979 | Sweden . |
| 79086740 | 8/1983 | Sweden . |
| 535886 | 11/1976 | U.S.S.R. . |
| 1333635 | of 0000 | United Kingdom . |
| 374467 | 3/1931 | United Kingdom . |
| 360127 | 11/1931 | United Kingdom . |
| 767629 | 12/1954 | United Kingdom . |
| 1276000 | 10/1969 | United Kingdom . |
| 1334594 | 10/1971 | United Kingdom . |
| 2021086 | 7/1982 | United Kingdom . |
| 40775 | of 0000 | Venezuela . |

OTHER PUBLICATIONS

Botts, W. B., et al Dry $SO_2$ Scrubber Systems, presented at American Public Power Association Engineering and Operations Workshop, San Francisco California 28 Feb.–2 Mar. 1978 pp. 1–11.

Thunen, Cabot, B. Laboratory Studies on the Applicability of Western United States Flyash to Wet Scrubbing for $SO_2$ Removal Thesis, University of North Dokota, Crawd Forks North Dokota May 1975.

Skotzki, Vopat, Power Station Engineering and Economy, McGraw-Hill, 1960, pp. 140, 212, 220, and 375.

Chambers, Dictionary of Science and Technology, 1982, p. 1086.

Beising, Kantz, Kirsch, Die Mineralsubstance der niederrheinischn Braunkohlen, Feb. 1972, pp. 38 and 43.

VDI Berichte, 267, 1976, pp. 18, 19, 25, 32, 61. VDI–Verlag GmbH Dusseldorf.

Arthur D. Little, Inc., "Application of Scrubbing Systems to Low Sulfur/Alkaline Ash Coals," Dec. 1977, 15 pgs.

Felsvang, Guide, Kaplan, "SO2 Spray Absorption With Dry

Wastes," Proceeding: Symposium on Flue Gas Desulphurization, Hollywood, Florida, Nov. 1977, pp. 1017–1021.

Keyes, "A Study Of The Absorption Of Sulphur Dioxide From Flue Gases," paper read before the American Section of the Society, (New York (Feb. 16, 1934).

Slack and Potts, "Disposal And Use Of Byproducts From Flue Gas Desulfurization Processes," presented at Flue Gas Desulfurization Symposium, Environmental Protection Agency, New Orleans, Louisiana (May 14–17, 1973).

Minnick, "Fixation And Disposal Of Flue Gas Waste Products,: Technical And Economic Assessment," presented at Environmental Protection Agency Flue Gas Desulfurization Symposium, New Orleans, Louisiana (May 14–17, 1973).

Jones and Stern, "Waste Products From Throwaway Flue Gas Cleaning Processes—Ecologically Sound Treatment And Disposal," Presented at U.S. Environmental Protection Agency Flue Gas Desulfurization Symposium, New Orleans, Louisiana (May 14–17, 1973).

Rossoff, Rossi and Meltzer, "Study Of Disposal And Utilization Of By–Products From Throwaway Desulfurization Processes," prepared for Flue Gas Desulfurization Symposium, New Orleans, Louisia a (May 14–17, 1973).

Taylor, "Experience In The Disposal And Utilization Of Sludge From Lime–Limestone Scrubbing Processes," presented at Flue Gas Desulfurization Symposium, New Orleans, Louisiana (May 14–17, 1973).

Jones, "Environmentally Acceptable Disposal Of Flue Gas Desulfurization Sludges: The EPA Research And Development Program," presented at EPA Control Systems Laboratory Symposium on Flue Gas Desulfization, Atlanta, Georgia (Nov. 4–7, 1974).

Elder, "Flue Gas Desulfurization Byproduct Disposal/Utilization Review and Status," presented at Flue Gas Defulfurization Symposium, Atlanta, Georgia (Nov. 4–7, 1974).

Rossoff, Rossi and Bornstein, "Disposal Of By–Products From Non–Regenerable Flue Gas Desulfurization Systems," presented at EPA Control Systems Laboratory Symposium on Flue Gas Desulfurization, Atlanta, Georgia (Nov. 4–7, 1974).

Schomaker, "Current Research On Land Disposal Of Hazardous Wastes," presented at Hazardous Waste Research Symposium: Tucson, Arizona (Feb. 2–4, 1976).

Bucy, Nevins, Corrigan, and Melicks, "Potential Utilization Of Controlled $So_x$ Emissions From Power Plants In Eastern United States," prepared for presentation at Sixth Flue Gas Desulfurization Symposium, New Orleans, Louisiana (Mar. 8–11, 1976).

Rossoff and Rossi, "Flue Gas Cleaning Waste Disposal–EPA Shawnee Field Evaluation," presented at the EPA Flue Gas Desulfurization Symposium, New Orleans, Louisiana (Mar. 8–11, 1976).

Crowe and Elder, "Status And Plans For Waste Disposal From Utility Applications Of Flue Gas Desulfurization Systems," prepared for presentation at Sixth Flue Gas Desulfurization Symposium, New Orleans, Louisiana (Mar. 8–11, 1976).

Destefanis, "The Handling & Transport Of Power Plant Scrubber Sludge Wastes," presented at American Power Conference, Chicago, Illinois (Apr. 20–22, 1976).

Engdahl and Rosenberg, "The Status of Flue Gas Desulfurization," Chemtech, Feb. 1978, pp. 118–128.

Stern, Ponder and Christman, "Proceedings: Symposium on Flue Gas Defulfurzation—New Orleans," U.S. Department of Commerce National Technical Information Service, vol. I, Mar. 1976, pp. 1–562.

Fockler, Botts and Phelan, "New Approach to Dry $SO_2$ Removal," Pollution Engineering, May 1978, pp. 46–48.

Kolar, "Vierjahrige Betribserfahrungen mit der atypischen Abgasreinigungsanlage des Heizkraftwerks Sandreuth der EWAG," VGK Kraftwerkstechnik 71 (1991), Heft 10, pp. 935–944.

Raffelsberger and Novak, "Planung und Betrieb der Abgasreinigungsanlagen im Kraftwerk Durnrohr," vGB Kraftwerkstechnik 68, Heft 5, May 1988, pp. 519–525.

Davis, Meyler, and Gude, "Dry $SO_2$ Scrubbing At Antelope Valley Station," presented at The American Power Conference, Apr. 23–25, 1979, 3 pgs.

Olsen, "The FLS–Gas Suspension Absorber (GSA)—a novel generation of semi-dry flue gas cleaning processes," FLS miljo Environmental Management, 13 pgs).

Donnelly, Andreasen "Spruhabsorption Rea Endprodukt Deponie Und Verwendung," Sep. 20, 1989, ans.nr. 2051/79, pp. D105, 106 and 110.

Felsvang, "Results From Operation Of Riverside Dry Scrubber," presented at The Riverside Dry FGD Symposium, Minneapolis, Minnesota Jun. 1981, 12 pgs.

Meyler, "Flue Gas Desulfurization Utilizing Dry Scurbbing," presented at Joint Power Generation Conference Sep. 11, 1978, Dallas, Texas 26 pgs.

Pamphlet of Joy Mfg. Co., "The Dry Scrubber For Flue Gas Desulfurization And Particulate Control," 1978, 4 pgs.

Janssen and Eriksen, "Basin Electric's Involvement With Dry Flue Gas Desulfurization," presented at EPA Symposium on Flue Gas Desulfurization, Las Vegas, Nevada Mar. 5–8, 1979, 26 pgs.

Kaplan and Felsvang, "Spray Dryer Absorption of $SO_2$ From Industrial Boiler Flue Gas," presented at Am. Institute of Chemical Engineers, Houston, Texas Apr. 1–5, 1979, 18 pgs.

Davis, Meyler and Gude, "Dry $SO_2$ Scrubbing," presented at The American Power Conference, Apr. 23–25, 1979, 18 pgs.

"Decision Of The Technical Board of Appeal 3.3.1 dated 15 Mar. 1984," Amtsblatt EPA/Official Journal EPO/Journal officiel OEB, pp. 265, 270.

European Patent Office Document regarding Publication No. 0,103,449, "Single Particle Multi–Metallic Reforming Catalyst And Process Of Using The Same," Decision Feb. 1, 1988.

Samuel, Lugar, Lapp, Murphy, Brna and Ostoop, "Process Characterization Of $SO_2$ Removal In Spray Absorber/Baghouse Systems,", 20 pgs.

Peterson and Rochelle, "Lime/Fly Ash Materials For Flue Gas Desulfurization: Effects Of Aluminum And Recycle Materials," presented at 1990 $SO_2$ Control Symposium, New Oreleans, Louisian May 5/14 11, 1990, 2 pgs.

Estcourt, Grutle, Gehri and Peters, "Tests Of A Two–Stage Combined Dry Scrubber/$SO_2$ Absorber Using Sodium Or Calcium," presented at 40th Annual meeting American Power Conference, Chicago, Illinois Apr. 26, 1978, 27 pgs.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims, 1, 3, 10 and 13 is confirmed.

Claims 2, 6, 11 and 12 are cancelled.

Claims 4, 5 and 7–9 are determined to be patentable as amended.

New claims 14–21 are added and determined to be patentable.

4. A process as claimed in claim[s] 1[or 2], wherein the flue gas, the sulfur dioxide content of which is to be reduced, is divided in an adjustable manner into two streams, one of them being fed to air dispersing means disposed in the upper part of a drying chamber of a spray dryer and being dispersed around a rotary atomizer wheel hanging in the drying chamber, while the other stream is introduced into the central part of the drying chamber and is dispersed under the atomizer wheel.

5. A process as claimed in claim[s] 1[or 2], wherein the calcium hydroxide–containing suspension contains an agent for increasing the solubility in water of calcium hydroxide.

7. The process of claim[s] 1 [or 2] wherein the molar ratio per unit time between the total reactive calcium hydroxide in said feed suspension and the sulfur dioxide in said flue gas feed is maintained in the range of from 0.3–2.0 by adjusting the composition and amount of said feed suspension and wherein from about 80 to about 98% of the sulfur dioxide is removed from said flue gas.

8. The process of claim 1 [or 2] wherein the recycled portion of said fly ash-containing powder comprises powder recovered directly from said drying chamber.

9. The process of claim 1 [or 2] wherein the recycled portion of said fly ash-containing powder comprises powder recovered directly from said drying chamber and powder recovered from the flue gas after leaving the drying chamber.

*14. A process as claimed in claim 13, wherein the flue gas, the sulfur dioxide content of which is to be reduced, is divided in an adjustable manner into two streams, one of them being fed to air dispersing means disposed in the upper part of a drying chamber of a spray dryer and being dispersed around a rotary atomizer wheel hanging in the drying chamber, while the other stream is introduced into the central part of the drying chamber and is dispersed under the atomizer wheel.*

*15. A process as claimed in claim 13, wherein the calcium hydroxide-containing suspension contains an agent for increasing the solubility in water of calcium hydroxide.*

*16. The process of claim 13 wherein the recycled portion of said fly ash-containing powder is mixed with water to form a first suspension and said feed suspension is prepared by adding to said first suspension fresh makeup calcium hydroxide in the form of an aqueous calcium hydroxide paste produced by slaking calcium oxide.*

*17. The process of claim 13 wherein the molar ratio per unit time between the total reactive calcium hydroxide in said feed suspension and the sulfur dioxide in said flue gas feed is maintained in the range of from 0.3–2.0 by adjusting the composition and amount of said feed suspension and wherein from about 80 to about 98% of the sulfur dioxide is removed from said flue gas.*

*18. The process of claim 13 wherein the recycled portion of said fly ash-containing powder comprises powder recovered directly from said drying chamber.*

*19. The process of claim 13 wherein the recycled portion of said fly ash-containing powder comprises powder recovered directly from said drying chamber and powder recovered from the flue gas after leaving the drying chamber.*

*20. The process of claim 13 wherein said hot, fly ash-containing flue gas is from the combustion of coal in a boiler and said flue gas has has no prior removal of fly ash therefrom.*

*21. The process of claim 13 wherein said feed suspension is prepared by mixing fresh makeup calcium hydroxide with said recycled powder.*

\* \* \* \* \*